(12) United States Patent
Yuen

(10) Patent No.: US 8,162,761 B2
(45) Date of Patent: Apr. 24, 2012

(54) LOW INTERFACE NOISE ROTARY SHAFT TIPS

(75) Inventor: Tat M. Yuen, Old Bridge, NJ (US)

(73) Assignee: S.S. White Technologies Inc., Piscataway, NJ (US)

( * ) Notice: Subject to any disclaimer, the term of this patent is extended or adjusted under 35 U.S.C. 154(b) by 192 days.

(21) Appl. No.: 12/708,816

(22) Filed: Feb. 19, 2010

(65) Prior Publication Data
US 2010/0252359 A1    Oct. 7, 2010

Related U.S. Application Data

(60) Provisional application No. 61/166,261, filed on Apr. 3, 2009.

(51) Int. Cl.
*F16C 1/08* (2006.01)

(52) U.S. Cl. ............................ 464/52; 464/90; 464/91

(58) Field of Classification Search ............... 464/52, 464/89–91; 74/502.4–502.6; 403/383
See application file for complete search history.

(56) References Cited

U.S. PATENT DOCUMENTS

| | | | |
|---|---|---|---|
| 2,255,234 A * | 9/1941 | Uhler | |
| 3,389,579 A | 6/1968 | Werner et al. | |
| 4,411,168 A | 10/1983 | Yoshifuji | |
| 4,667,530 A * | 5/1987 | Mettler et al. | 464/89 X |
| 4,849,038 A | 7/1989 | Burghardt et al. | |
| 5,913,944 A * | 6/1999 | Haynes et al. | 74/502.6 |
| 2008/0004123 A1 * | 1/2008 | Mellor | |
| 2011/0065517 A1 * | 3/2011 | Yuen | |

FOREIGN PATENT DOCUMENTS

EP    1286065 A1    2/2003

* cited by examiner

*Primary Examiner* — Gregory Binda
(74) *Attorney, Agent, or Firm* — Arthur L. Lessler

(57) ABSTRACT

A rotary shaft having ends with a surface layer or raised portions made of a compressible, preferably elastic, material, the ends including the surface layer or raised portions being covered with relatively thin walled durable plastic tubing.

8 Claims, 4 Drawing Sheets

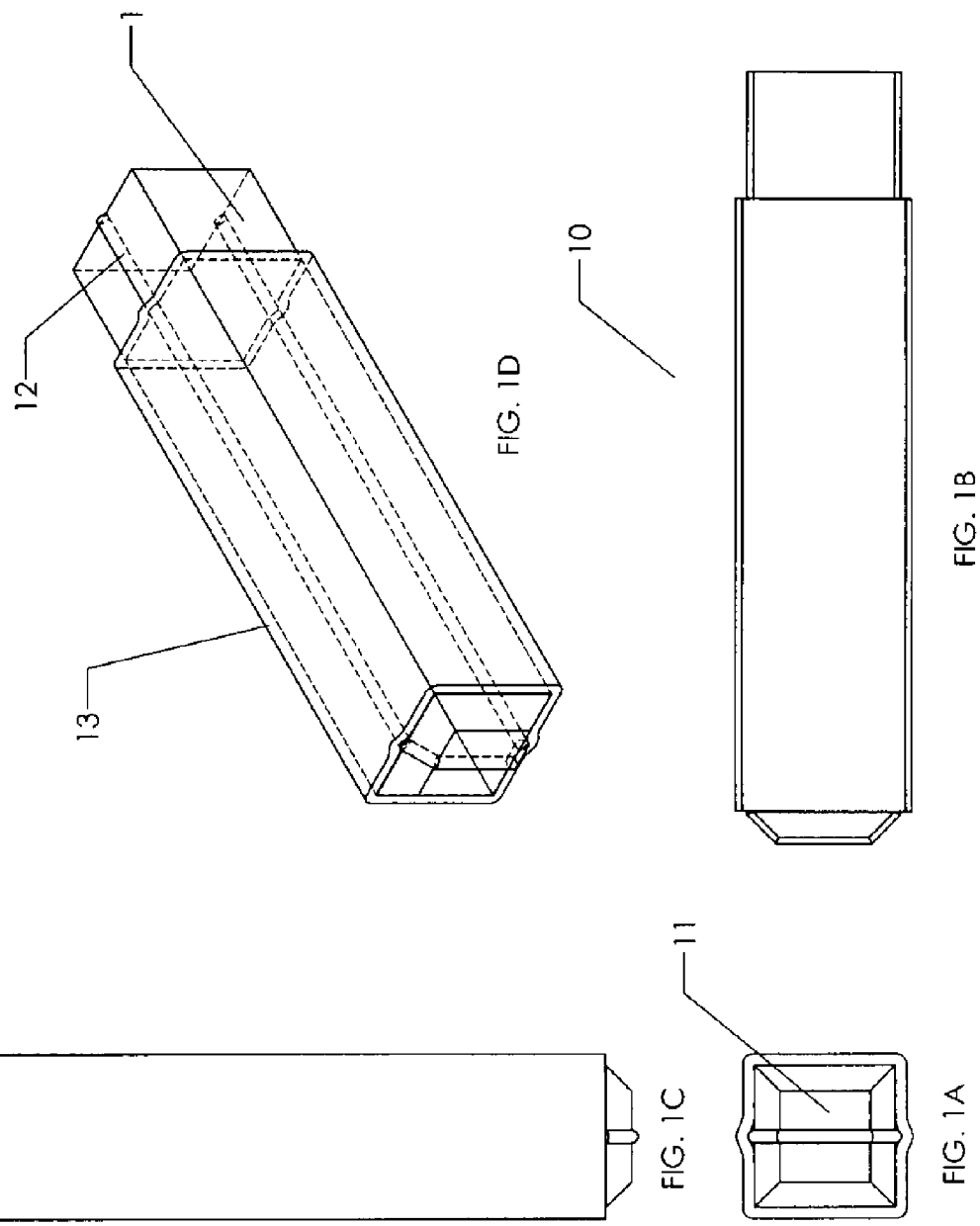

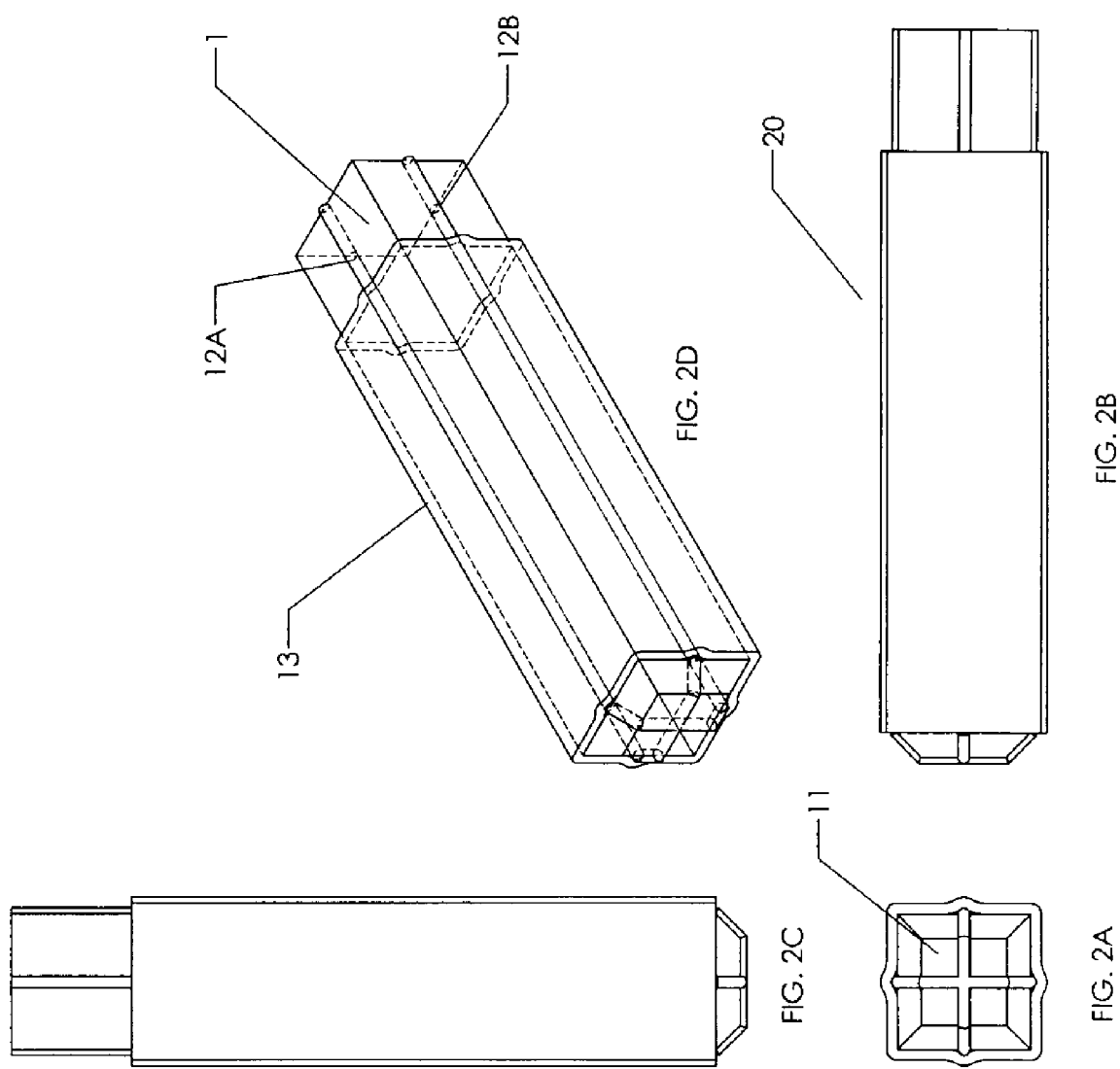

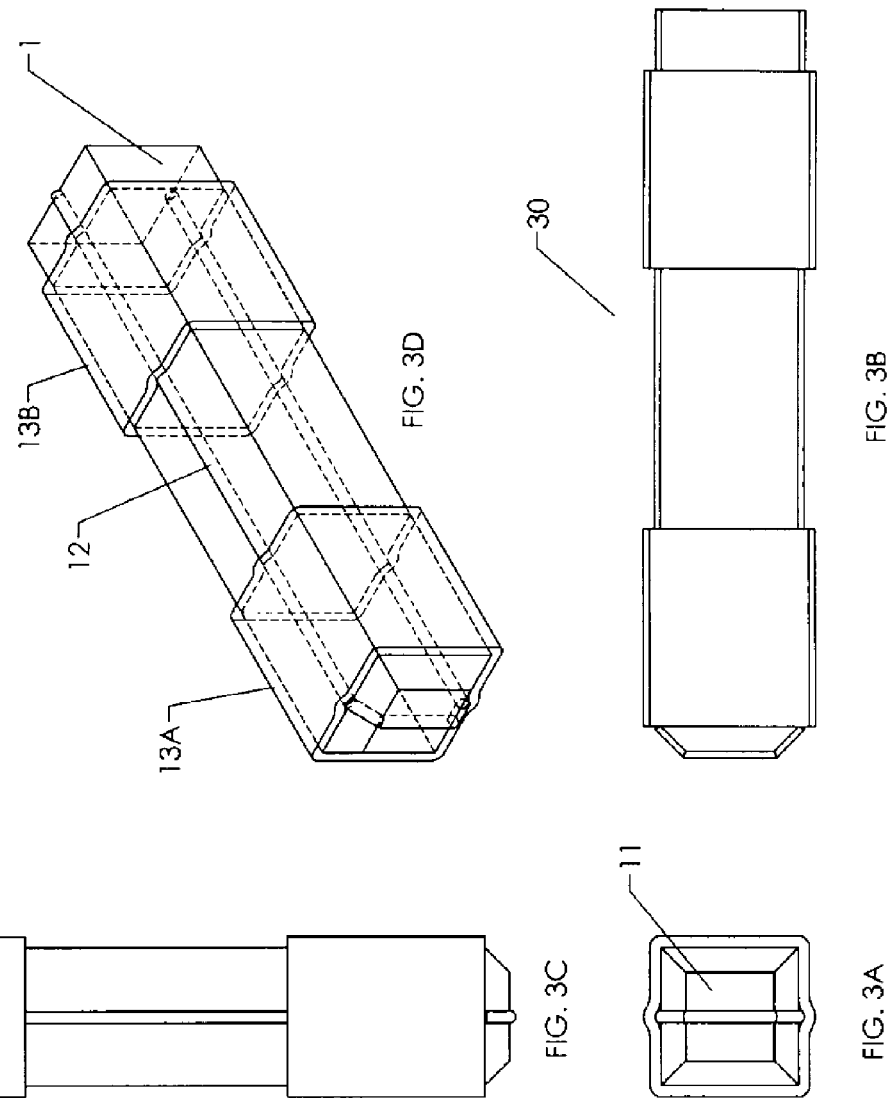

LOW INTERFACE NOISE ROTARY SHAFT TIPS

CROSS-REFERENCE TO RELATED APPLICATIONS

This application claims the benefit of U.S. provisional application Ser. No. 61/166,261 filed Apr. 3, 2009 and entitled Low Interface Noise Rotary Shaft Tips.

BACKGROUND OF THE INVENTION

The present invention relates to tips or ends of rotating flexible shafts, which tips or ends are adapted to engage mating elements of driving or driven members; and is particularly suited for use with, but not limited to wire wound flexible shafts.

Rotary flexible shafts for transmitting torque may be flexible or solid, and typically have square ends adapted to engage square recesses of mating driving and driven parts. Rotary flexible shafts commonly used to transmit torque from a motor to adjust a seat in a motor vehicle, for example, are of wire wound construction and may, but need not, have helical square ends as shown in U.S. Pat. No. 6,464,588 to Rupp.

Typically the shaft and its male ends are steel and each female mating part is steel or plastic. To insure assembly will always be possible, manufacturing tolerances are set so that the maximum dimensions of the shafts are smaller than the minimum dimensions of the recesses in the mating parts. The interface is therefore always somewhat loose and can be noisy at operating rotational speeds.

It is known to add a layer of deformable material to the interface between the shaft ends and the mating recesses that dampens contact and reduces clearance, and thus functions to reduce noise. This noise reduction material, however, also has dimensional tolerances, and is subject to wear.

In European Patent Application Serial No. EP 1286065 of Otto Suhner AG (inventor Theo Eichenberger) entitled Flexible Shaft With Noise Reducing Component, a flexible shaft for adjusting a motor vehicle seat has a surrounding casing, and noise is reduced by incorporating a relatively large diameter flocked yarn wire in the outer wire layer, so that the yarn helps to reduce noise due to contact between the rotating outer wire layer and the surrounding casing.

In U.S. Pat. No. 3,389,579 to Werner et al. entitled Shaft Guided In A Protection Tube, noise isolation between a flexible shaft and a surrounding protection tube is provided by adhering short elastic fibers to the outer surface of the shaft or the inner surface of the protection tube, to form a brush-like layer between the shaft and tube.

In U.S. Pat. No. 4,411,168 to Yoshifuji entitled Inner Cable, noise due to contact between a push-pull wire wound flexible cable and a surrounding conduit is reduced by winding a hollow elastic member on the cable core between wire teeth also wound on the core, the elastic member having a greater diameter than the teeth so that only the elastic member contacts the inner surface of the conduit, thus reducing noise when the cable is moved longitudinally.

In U.S. Pat. No. 4,849,038 to Burghardt entitled Method For Depositing An Interlining On A Pitched Cable For Reducing Friction And Noise, a filament flocked with abrasion resistant material is wound or deposited on a wire wound flexible shaft, interleaved with the wire of the outer layer of the shaft.

The sum of the maximum dimensions of the noise reducing material and the maximum dimensions of the shaft must still be such that the shaft end and the noise damping material can be installed in a mating part of the smallest possible manufactured dimensions. On the other hand, the sum of the minimum dimensions of the noise reducing material and the minimum dimensions of the shaft must fit within a mating recess of the largest possible manufactured dimensions with little or no clearance.

Therefore the noise reducing material must be such that it can be easily compressed or displaced during insertion of the shaft assembly into the mating recess, while exhibiting resistance to wear.

Accordingly, an object of the present invention is to provide a mass-producible rotary shaft that exhibits low rotational noise when coupled between driving and driven members.

SUMMARY OF THE INVENTION

According to the invention a rotary shaft is provided with ends having outer raised portions made of a compressible material. The ends include relatively raised portions which are covered with plastic tubing having a wall thickness substantially less than the thickness of the raised portions.

IN THE DRAWING

FIG. 1A is a front elevation view of a rotary shaft end according to a first embodiment of the invention.

FIG. 1B is a right side elevation view of the shaft end shown in FIG. 1A.

FIG. 1C is a top plan view of the shaft end shown in FIG. 1A.

FIG. 1D is an isometric view of the shaft end shown in FIG. 1A.

FIG. 2A is a front elevation view of a rotary shaft end according to a second embodiment of the invention.

FIG. 2B is a right side elevation cross-sectional view of the shaft end shown in FIG. 2A.

FIG. 2C is a top plan view of the shaft end shown in FIG. 2A.

FIG. 2D is an isometric view of the shaft end shown in FIG. 2A.

FIG. 3A is a front elevation view of a rotary shaft end according to a third embodiment of the invention.

FIG. 3B is a right side elevation view of the shaft end shown in FIG. 3A.

FIG. 3C is a top plan view of the shaft end shown in FIG. 3A.

FIG. 3D is an isometric view of the shaft end shown in FIG. 3A.

DETAILED DESCRIPTION

Figure 4B:
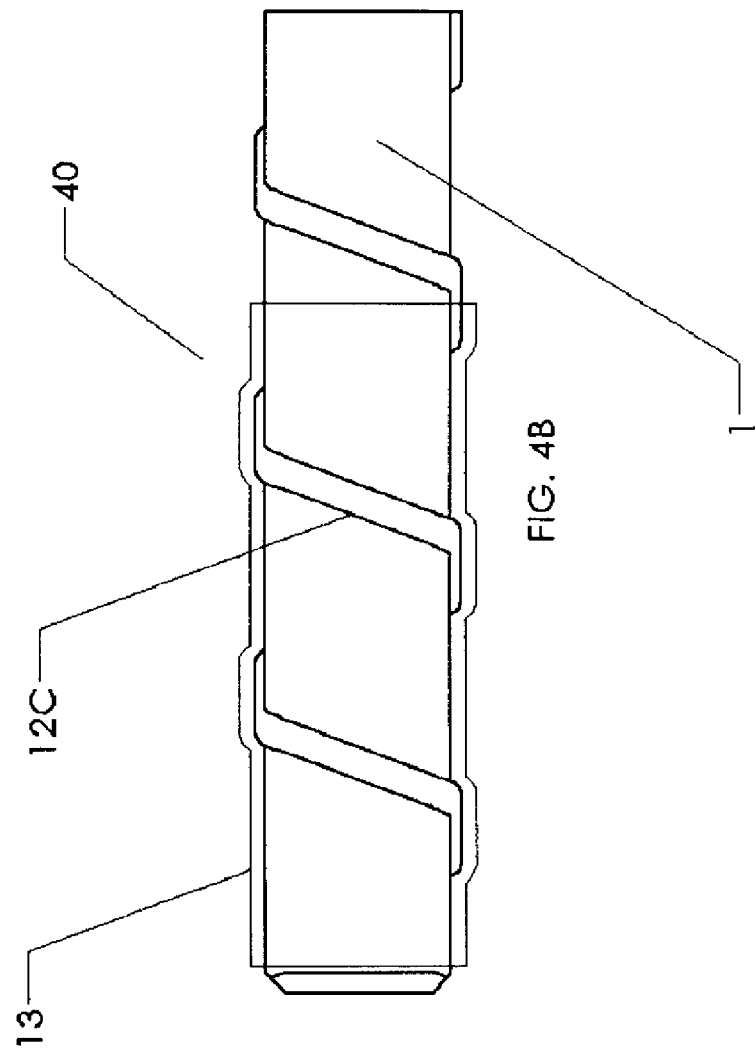
FIG. 4B is a right side elevation view of the shaft end shown in FIG. 4A.

Shown in FIGS. 1A, 1B, 1C and 1D is the end assembly 10 of a flexible shaft 1 having a square cross-section. The end portion of the shaft 1 is the major element of the assembly and is preferably made of steel.

A protruding strand 12 of a compressible material such as flocked yarn forms a ridge extending centrally along the top and bottom surfaces of the shaft end, and along a center line of the front surface 11 thereof.

A resilient plastic layer 13 of thin-walled polyester heat-shrink tubing covers the sides of the shaft end portion and may extend a small distance (typically 1 to 2 millimeters) beyond the front surface 11 so as to provide a small space between the metal end surface 11 and the adjacent surface of a mating receptacle, thereby avoiding metal to metal contact of those surfaces and thus reducing noise when the shaft is rotated. The tubing layer 13 has a wall thickness substantially less than the thickness of the ridge comprising the compressible strand 12.

When the shaft end portion is inserted into a mating recess of a driving or driven member (not shown), the yarn ridge is compressed to provide a tight fit between the shaft end and the recess, which results in an interface that has a durable interference fit which minimizes noise generated by relative movement between the mating surfaces when the shaft is rotated.

In the second embodiment shown in FIGS. 2A, 2B, 2C, and 2D, the shaft end assembly 20 has flocked yarn strands 12A and 12B which form longitudinal ridges extending centrally along the top, bottom, left side and right side surfaces of the end of the shaft 1, with the sides of the shaft end portion being covered by the heat shrink tubing layer 13.

In the third embodiment shown in FIGS. 3A, 3B, 3C, and 3D, the shaft end assembly 30 has a flocked yarn strand 12 which forms a ridge centrally along the top and bottom surfaces of the shaft end 1, and along a center line of the front surface 11 thereof, with the sides of the shaft end portion being covered by the heat shrink tubing sections 13A and 13B. Heat shrink sections 13A and 13B are sized and spaced such that both sections are within the region of interface contact, serving to mitigate both the wear and compaction of the exposed elastic flocked yarn section in between. In this embodiment, the exposed flocked yarn, or other soft elastic material, dampens vibration better than the heat shrink tubing material but does not have the required durability without the indirect protection of the heat shrink tubing.

Figure 4A:
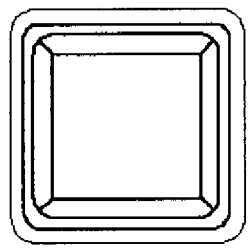
FIG. 4A is a front elevation view of a rotary shaft end according to a fourth embodiment of the invention.

In the fourth embodiment shown in FIGS. 4A and 4B, the shaft end assembly 40 has a flocked yarn strand ridge 12C extending helically along and around the end portion of the shaft 1, with the sides of the shaft end portion being covered by the heat shrink tubing layer 13. The ridge may alternatively comprise a material deposited on and adherent to the end portion.

The end portion of the shaft 1 may be wire wound or solid, and where wire wound may be made of a wire material other than steel. Where the shaft is a wire wound one, the yarn strand may be wound with the wires that make up the outer layer of the shaft.

The shaft end portion need not be unitary with the main part of the shaft, but may be a fitting attached to the adjacent end of the shaft.

Multiple strands of yarn may be used instead of a single strand. Instead of flocked yarn, other relatively soft, preferably elastic, materials may be employed to form the ridge or ridges. Instead of ridges, the damping material may be a uniform or non-uniform layer. The heat shrink tubing may be of any material suitable for specific applications. Instead of tubing, a covering may be applied over the damping material in pre-cured or molten form and subsequently solidified. The layer 13 may alternatively comprise a thermoplastic or thermosetting plastic material.

Instead of being square, the end portion cross-section of the shaft may have any desired noncircular configuration.

Instead of flocked yarn, the ridges may be formed by applying flocking directly to the shaft end portion, for example by electrostatic means known in the art.

Typically, when the interface is square in cross-section and both the shaft end portion and the female member having the mating recess are made of metal, the female member is provided with a broached square hole with the remnant of a pilot hole, the diameter of which is greater than the side-to-side dimension of the square end portion of the shaft.

According to the preferred embodiments of the invention, one or more compressible longitudinally extending ridges or bulges are provided on the shaft end portion to cause the end portion to fit snugly into the recess of the female mating part and tightly engage the walls thereof. Since rotary force is transmitted near the longitudinally extending corners of the interface—that is, where the corners of the shaft end portion engage walls of the recess, the bulge(s) or ridge(s), which is(are) preferably disposed away from the corners, is(are) less likely to wear than the corners, thus extending the tight-fitting life of the interface.

I claim:

1. A wire wound rotary shaft with noncircular ends,
   at least one end having an outer raised portion comprising compressible material,
   said raised portion being covered with a plastic layer having a wall thickness substantially less than the thickness of the raised portion,
   said end portion having longitudinally extending corners and a longitudinally extending ridge disposed away from said corners.

2. The assembly according to claim 1, wherein said ridge comprises flocked yarn.

3. The assembly according to claim 1, wherein said ridge comprises a material deposited on and adherent to said end portion.

4. The assembly according to claim 2 or 3, wherein said plastic layer comprises a resilient material.

5. The assembly according to claim 1, wherein said raised portion comprises a ridge which extends helically around at least a part of said shaft end portion.

6. A wire wound shaft assembly for transmitting torque, comprising:
   a shaft having an end portion of noncircular cross-section;
   at least one longitudinally extending ridge of flocked yarn secured to said end portion, said end portion having longitudinally extending corners and said ridge being disposed away from said corners; and
   a layer of thermoplastic or thermosetting plastic material overlying said ridge and said shaft end portion.

7. The shaft assembly according to claim 6, wherein the thickness of said plastic layer is substantially less than the thickness of said ridge.

8. The shaft assembly according to claim 6 or 7, wherein the material comprising said ridge is elastic.

* * * * *